(12) United States Patent
Lin et al.

(10) Patent No.: US 9,866,254 B2
(45) Date of Patent: Jan. 9, 2018

(54) MOBILE DEVICE PROTECTION JACKET

(71) Applicants: Alan Lin, Arcadia, CA (US); LiYi Liu, Tainan (TW)

(72) Inventors: Alan Lin, Arcadia, CA (US); LiYi Liu, Tainan (TW)

(*) Notice: Subject to any disclaimer, the term of this patent is extended or adjusted under 35 U.S.C. 154(b) by 0 days.

(21) Appl. No.: 15/075,159

(22) Filed: Mar. 20, 2016

(65) Prior Publication Data

US 2016/0336987 A1 Nov. 17, 2016

(51) Int. Cl.
*H04M 1/00* (2006.01)
*H04B 1/3888* (2015.01)

(52) U.S. Cl.
CPC .................. *H04B 1/3888* (2013.01)

(58) Field of Classification Search
CPC ......... H01L 2924/0002; H01L 2924/00; H01L 23/10
USPC .................. 455/575, 41.2, 575.8, 566, 757.1
See application file for complete search history.

(56) References Cited

U.S. PATENT DOCUMENTS

| | | | | |
|---|---|---|---|---|
| 2012/0314354 A1* | 12/2012 | Rayner | ................ | G06F 1/1656 361/679.01 |
| 2013/0126531 A1* | 5/2013 | Hynecek | .............. | H05K 5/0217 220/315 |
| 2013/0271902 A1* | 10/2013 | Lai | ............................ | H04R 1/02 361/679.01 |
| 2013/0292269 A1* | 11/2013 | Tages | ...................... | A45C 11/00 206/37 |
| 2013/0292378 A1* | 11/2013 | Tages | ................... | H05K 5/0086 220/4.02 |
| 2013/0294020 A1* | 11/2013 | Rayner | .................. | H05K 5/061 361/679.01 |
| 2013/0296004 A1* | 11/2013 | Tages | ....................... | H05K 5/03 455/575.8 |
| 2014/0055014 A1* | 2/2014 | Pan | .......................... | H05K 5/02 312/223.2 |
| 2014/0190841 A1* | 7/2014 | Nash | ..................... | H05K 9/0045 206/37 |
| 2014/0233180 A1* | 8/2014 | Vargas | .................. | G06F 1/1632 361/679.55 |

(Continued)

OTHER PUBLICATIONS

A&T Industry, Comparison between the silicone, TPU and PC material Jan. 8, 2016.*

*Primary Examiner* — Joseph Arevalo
(74) *Attorney, Agent, or Firm* — Che-Yang Chen; Law Offices of Scott Warmuth

(57) ABSTRACT

A mobile device protection jacket includes a covering jacket body and a back cover, wherein a front piece is provided on the covering jacket body and a side protection piece is formed on a periphery of the front protection piece in an extending and penetrating manner, so a holding space for holding a mobile device is formed between the front protection piece and side protection piece and embedment catching portions are formed on an outer edge of the side protection piece; and wherein embedment fixing portions are formed on an outer edge of the back cover at positions corresponding to the embedment catching portions on the outer edge of the side protection piece of the covering jacket body, such that the back cover can be jointed and fixed through mutual embedment and catching of the embedment fixing portions and the embedment catching portions of the side protection piece.

3 Claims, 4 Drawing Sheets

(56) References Cited

U.S. PATENT DOCUMENTS

2016/0187932 A1* 6/2016 Lin ..................... G06F 1/1656
   361/679.09
2016/0254835 A1* 9/2016 Ashley ................. H04B 1/3888
   455/575.8

* cited by examiner

MOBILE DEVICE PROTECTION JACKET

FIELD OF THE INVENTION

The present disclosure relates to a mobile device protection jacket, in particular to an innovative design of a mobile device protection jacket which not only has excellent protection effects such as scratch protection, falling prevention and collision protection, but also has a better waterproof effect because the mobile device is fully covered, such that the overall practicability thereof in use is greatly improved.

BACKGROUND OF THE INVENTION

In the modern society that technologies related to communication are vigorously developed. Since mobile phones can enable a user to directly communicate with another party at any distant place under the situation that signals are available, the inconvenience that people can only use indoor telephones indoors or public telephones outdoors to communicate with people at distant place can be overcome, such that the mobile phones have excellent practicability and convenience; and thus, mobile phones are deeply loved and widely used by people. Nowadays, almost everyone holds a mobile phone and it is likely that one person holds more than one mobile phone.

With the quick development of technologies, mobile phones not only are used for dialing phones for communication only, but also have an Internet surfing function. Moreover, all kinds of APP software can be installed on the mobile phones such that the mobile phones can be used as mobile computers and the users can perform various operations by using the APP software.

Generally, during the use of the mobile phones, in order to protect the mobile phones, the users often cover the mobile phones with protection jackets. Not only can the protection jackets be used for covering the mobile phones and achieve protection effects such as of preventing the mobile phones from being scratched and collided, but also the overall attractiveness of the mobile phones can be improved.

FIG. 3 is a stereoscopic structural schematic view of the existing protection jacket, and FIG. 4 is a sectional structural schematic view of the existing protection jacket in a use state, wherein a protection jacket (5) made of a flexible material is arranged corresponding to a mobile device (4), the protection jacket (5) has a back plate (51) and a side plate (52) is formed on a periphery of the back plate (51) in an extending and protruding manner, such that a holding space (53) is formed between the back plate (51) and the side plate (52), a back end of the mobile device (4) can be held in the holding space (53) of the protection jacket (5), the back end and a side end of the mobile device (4) can be covered by using the protection jacket (5), a protection film (6) is stuck on a panel of the mobile device (4) and thereby the protection film (6) has an effect of preventing the panel of the mobile device (4) from being scratched.

Although the above-mentioned protection jacket can cover the mobile device to achieve an expected effect of preventing the mobile device from being collided, it is found that, during the actual operation and use of the mobile device, the protection jacket can only protect the back side and the side end of the mobile device covered by the protection jacket and cannot achieve the protection effect of the screen of the mobile device. Consequently, the user needs to additionally stick a protection film on the screen of the mobile device. However, the protection film has a very limited effect of protecting the screen of the mobile device. In addition, since the protection needs to be additionally stuck, it causes great inconvenience to the user and there remains a need for a new and improved design for the mobile device protection jacket to overcome the problem stated above.

SUMMARY OF THE INVENTION

The main purpose of the present disclosure is to provide a mobile device protection jacket, which is mainly used for fully covering a mobile device and not only has excellent protection effects such as scratch protection, falling prevention and collision protection, but also has a better waterproof effect because the mobile device is fully covered, such that the overall practicability thereof in use is greatly improved.

The mobile device protection jacket mainly comprises a covering jacket body and a back cover, wherein the covering jacket body is made of a flexible transparent material, a front piece is provided on the covering jacket body and a side protection piece is formed on a periphery of the front protection piece in an extending and penetrating manner, such that a holding space for holding a mobile device is formed between the front protection piece and the side protection piece and embedment catching portions are formed on an outer edge of the side protection piece; and embedment fixing portions which are fit with the embedment catching portions are formed on an outer edge of the back cover at positions corresponding to the embedment catching portions on the outer edge of the side protection piece of the covering jacket body, such that the back cover can be jointed and fixed through mutual embedment and catching of the embedment fixing portions and the embedment catching portions of the side protection piece of the covering jacket body.

In a preferred embodiment of the mobile phone protection jacket of the present disclosure, the covering jacket body is made of TPU (Thermoplastic Polyurethane).

In a preferred embodiment of the mobile phone protection jacket of the present disclosure, a microstructure layer is formed on an inner side end surface of the front protection piece.

In a preferred embodiment of the mobile phone protection jacket of the present disclosure, the microstructure layer of the front protection piece is formed by fine particles.

In a preferred embodiment of the mobile phone protection jacket of the present disclosure, the back cover is made of any one of PP (Polypropylene), PPC (Polypropylene carbonate) and plastic.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
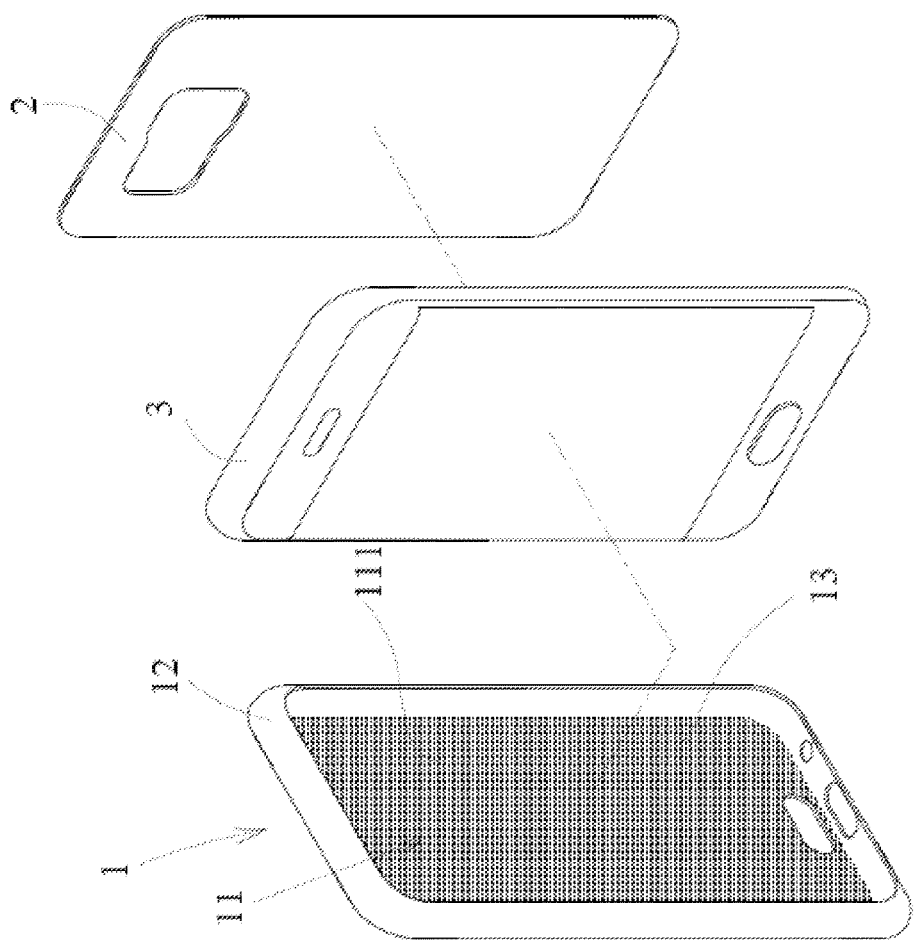
FIG. 1 is an exploded view of the mobile device protection jacket present invention.
Figure 2:
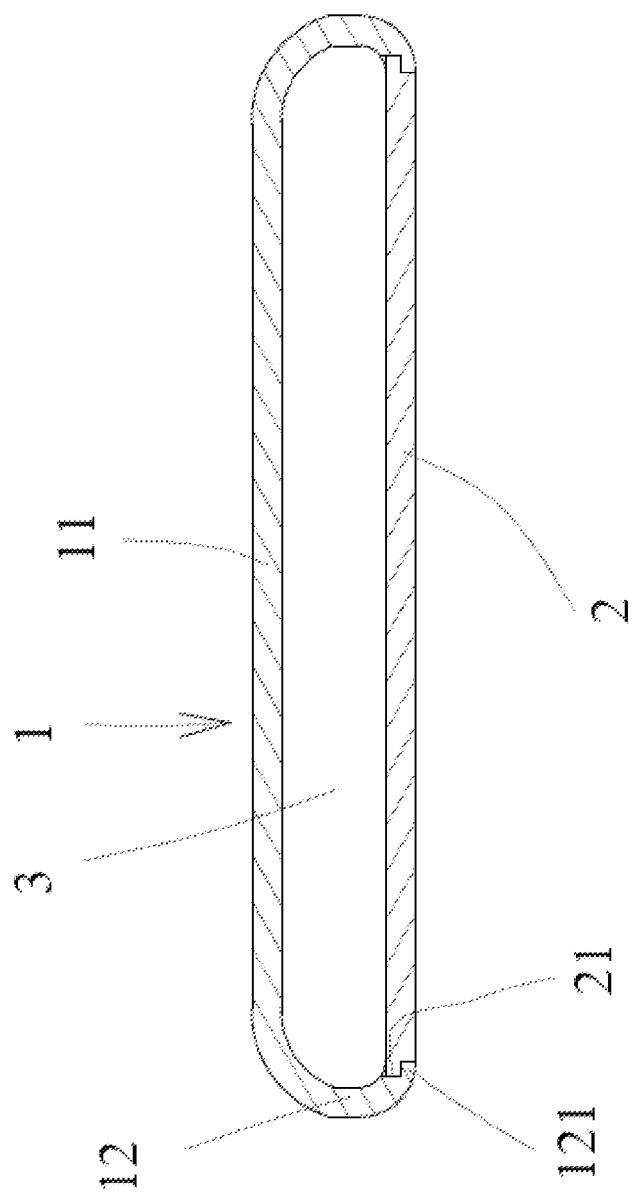
FIG. 2 is a sectional view of the mobile device protection jacket present invention.
Figure 3:
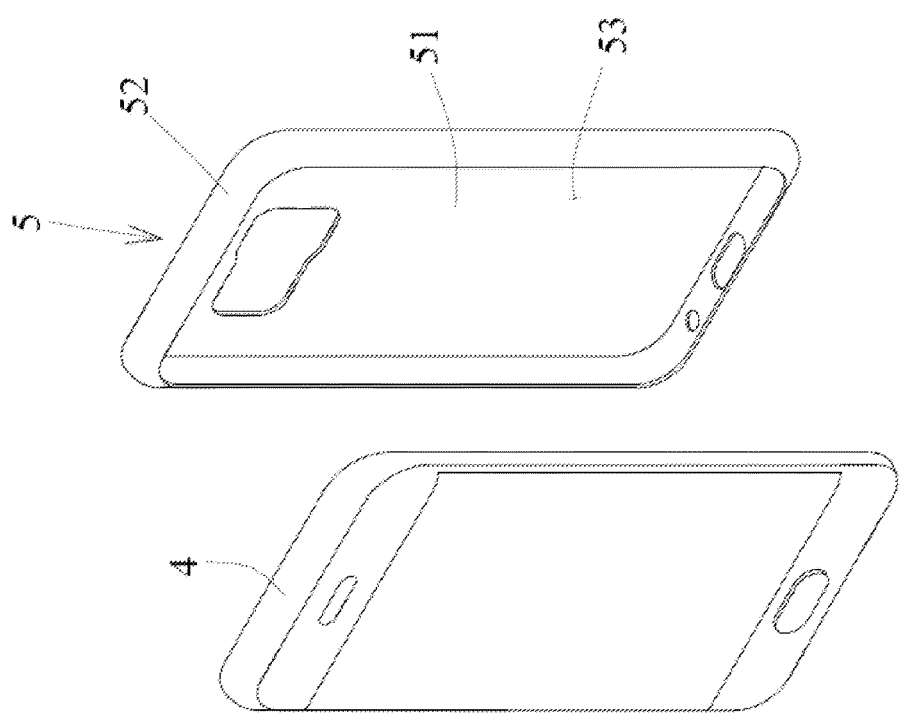
FIG. 3 is schematic view of a prior art related to the mobile device protection jacket.
Figure 4:
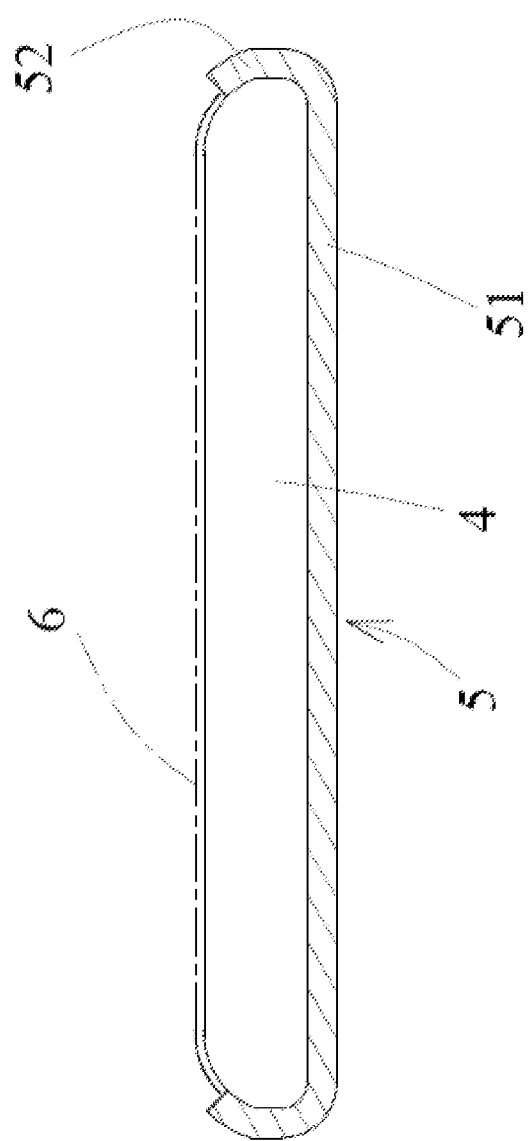
FIG. 4 is sectional view of a prior art related to the mobile device protection jacket.

In order to further understand the goal, characteristics and effect of the present invention, a number of embodiments along with the drawings are illustrated as following:

Referring to FIGS. 1 and 2, the present invention provides a mobile device protection jacket, which comprises a covering jacket body (1) and a back cover (2). The covering jacket body (1) is made of a flexible transparent material such as TPU (Thermoplastic Polyurethane), a front piece (11) is provided on the covering jacket body (1), a microstructure layer (111) formed by fine particles (such as convex points) is formed on an inner side end surface of the front protection piece (11) and a side protection piece (12) is formed on a periphery of the front protection piece (11) in an extending and protruding manner, such that a holding space (13) is formed between the front protection piece (11) and the side protection piece (12) and embedment catching portions (121) are formed on an outer edge of the side protection piece (12).

The back cover (2) is made of PP (Polypropylene), PPC (Polypropylene carbonate), plastic and the like, embedment fixing portions (21) which are fit with the embedment catching portions (121) are formed on an outer edge of the back cover (2) at positions corresponding to the embedment catching portions (121) on the outer edge of the side protection piece (12) of the covering jacket body (1), such that the back cover (2) can be jointed and fixed through mutual embedment and catching of the embedment fixing portions (21) and the embedment catching portions (121) of the side protection piece (12) of the covering jacket body (1).

Thereby, a panel of a mobile device (3) can correspond to the front protection piece (11) of the covering jacket body (1), such that the mobile device (3) is held in the holding space (13) formed between the front protection piece (11) and the side protection piece (12) of the covering jacket body (1), the panel and a side end of the mobile device (3) are covered and protected by using the covering jacket body (1), the situation of close jointing cannot be realized due to air bubbles formed between the front protection piece (11) and the panel of the mobile device (3) can be avoided through the microstructure layer (111) formed on the inner side end surface of the front protection piece (11) of the covering jacket body (1), the back cover (2) can be jointed and fixed through mutual embedment and catching of the embedment fixing portions (21) and the embedment catching portions (121) of the side protection piece (12) of the covering jacket body (1) and thus the protection effect of fully covering the mobile device (3) can be achieved.

According to the above-mentioned description and the structure component and use implementation description of the present disclosure, it can be seen that, compared with the existing structure, the mobile device protection device mainly can fully cover the mobile device and not only has excellent protection effects such as scratch protection, falling prevention and collision protection, but also has a better waterproof effect because the mobile device is fully covered, such that the overall practicability thereof in use is greatly improved.

Having described the invention by the description and illustrations above, it should be understood that these are exemplary of the invention and are not to be considered as limiting. Accordingly, the invention is not to be considered as limited by the foregoing description, but includes any equivalent.

What is claimed is:

1. A mobile device protection jacket, comprising a covering jacket body and a back cover,
   wherein the covering jacket body is made of a flexible transparent material, a front protection piece is provided on the covering jacket body and a side protection piece is formed on a periphery of the front protection piece in an extending and penetrating manner, such that a holding space for holding a mobile device is formed between the front protection piece and the side protection piece and embedment catching portions are formed on an outer edge of the side protection piece;
   wherein embedment fixing portions which are fit with the embedment catching portions are formed on an outer edge of the back cover at positions corresponding to the embedment catching portions on the outer edge of the side protection piece of the covering jacket body, such that the back cover can be jointed and fixed through mutual embedment and catching of the embedment fixing portions and the embedment catching portions of the side protection piece of the covering jacket body; and
   wherein a microstructure layer having convex fine particles is formed on an inner side end surface of the front protection piece to eliminate air bubbles formed between the front protection piece and a panel of the mobile device to hold the mobile device closer to the protection jacket.

2. The mobile device protection jacket according to claim 1, wherein the covering jacket body is made of TPU (Thermoplastic Polyurethane).

3. The mobile device protection jacket according to claim 1, wherein the back cover is made of any one of PP (Polypropylene), PPC (Polypropylene carbonate) and plastic.

* * * * *